United States Patent
Zimmer

(10) Patent No.: US 12,552,125 B2
(45) Date of Patent: Feb. 17, 2026

(54) METHOD AND SYSTEM FOR CARDBOARD PRETREATMENT

(71) Applicant: HIGHCON SYSTEMS LTD., Yavne (IL)

(72) Inventor: Michael Zimmer, Moshav Beit-Eliazari (IL)

(73) Assignee: HIGHCON SYSTEMS LTD., Yavne (IL)

( * ) Notice: Subject to any disclaimer, the term of this patent is extended or adjusted under 35 U.S.C. 154(b) by 588 days.

(21) Appl. No.: 17/341,566

(22) Filed: Jun. 8, 2021

(65) Prior Publication Data

US 2021/0291301 A1 Sep. 23, 2021

Related U.S. Application Data

(62) Division of application No. 14/427,022, filed as application No. PCT/IL2013/000071 on Sep. 16, 2013, now Pat. No. 11,059,253.

(Continued)

(51) Int. Cl.
*B31B 50/25* (2017.01)
*B23K 26/00* (2014.01)
(Continued)

(52) U.S. Cl.
CPC .......... *B31B 50/25* (2017.08); *B23K 26/0006* (2013.01); *B23K 26/0892* (2013.01);
(Continued)

(58) Field of Classification Search
CPC ......... B31B 50/25; B31B 50/20; B31B 50/14; B31B 50/006; B31B 50/252; B23K 26/364; B23K 26/60; B23K 26/0006; B23K 26/0892; B23K 26/38; B23K 26/40; B23K 50/252; B23K 2103/50; B23K 2103/40; B26D 3/085; B26D 9/00; B31F 1/08; B26F 1/00
(Continued)

(56) References Cited

U.S. PATENT DOCUMENTS 3,626,143 A * 12/1971 Fry ................... B29C 59/007
65/121
3,772,949 A 11/1973 Pavone et al.
(Continued)

FOREIGN PATENT DOCUMENTS

CN 101862903 A 10/2010
CN 102582253 A 7/2012
(Continued)

OTHER PUBLICATIONS

Translation of communication dated May 16, 2017, issued from the Japan Patent Office in counterpart Japanese Patent Application No. 2015-532571.
(Continued)

*Primary Examiner* — Sameh Tawfik
(74) *Attorney, Agent, or Firm* — Sughrue Mion, PLLC

(57) ABSTRACT

A system and methods for operating a cardboard processing machine, the method comprising creating a pre-processing crease at a location on the cardboard where it is required to process the cardboard; and processing the cardboard along the pre-process crease.

9 Claims, 7 Drawing Sheets

Related U.S. Application Data

(60) Provisional application No. 61/703,239, filed on Sep. 19, 2012.

(51) Int. Cl.

| | | |
|---|---|---|
| *B23K 26/08* | (2014.01) | |
| *B23K 26/364* | (2014.01) | |
| *B23K 26/38* | (2014.01) | |
| *B23K 26/40* | (2014.01) | |
| *B23K 26/60* | (2014.01) | |
| *B26D 3/08* | (2006.01) | |
| *B26D 9/00* | (2006.01) | |
| *B31B 50/20* | (2017.01) | |
| *B31F 1/08* | (2006.01) | |
| *B23K 103/00* | (2006.01) | |
| *B26D 5/00* | (2006.01) | |
| *B26F 1/00* | (2006.01) | |
| *B31B 50/00* | (2017.01) | |
| *B31B 50/14* | (2017.01) | |

(52) U.S. Cl.
CPC ............ *B23K 26/364* (2015.10); *B23K 26/38* (2013.01); *B23K 26/40* (2013.01); *B23K 26/60* (2015.10); *B26D 3/085* (2013.01); *B26D 9/00* (2013.01); *B31B 50/20* (2017.08); *B31F 1/08* (2013.01); *B23K 2103/40* (2018.08); *B23K 2103/50* (2018.08); *B26D 5/005* (2013.01); *B26F 1/00* (2013.01); *B31B 50/006* (2017.08); *B31B 50/14* (2017.08); *B31B 50/252* (2017.08)

(58) Field of Classification Search
USPC .......................................................... 493/22
See application file for complete search history.

(56) References Cited

U.S. PATENT DOCUMENTS

| | | | |
|---|---|---|---|
| 3,844,201 A | 10/1974 | Eggert et al. | |
| 3,909,582 A * | 9/1975 | Bowen | B23K 26/0846 |
| | | | 383/207 |
| 4,049,945 A | 9/1977 | Ehlscheid et al. | |
| 4,221,145 A | 9/1980 | Shimizu et al. | |
| 5,000,725 A | 3/1991 | Bauknecht | |
| 5,108,358 A | 4/1992 | Mounce | |
| 5,158,499 A * | 10/1992 | Guckenberger | B32B 27/08 |
| | | | 383/207 |
| 5,341,713 A | 8/1994 | Okamoto et al. | |
| 5,470,300 A | 11/1995 | Terranova | |
| 5,744,776 A * | 4/1998 | Bauer | B23K 26/123 |
| | | | 219/121.7 |
| 5,899,129 A | 5/1999 | Sumida et al. | |
| 6,074,097 A * | 6/2000 | Hayashi | B65D 75/5805 |
| | | | 383/208 |
| 6,098,874 A * | 8/2000 | Tokarski | B65D 5/541 |
| | | | 493/110 |
| 6,177,648 B1 * | 1/2001 | Lawson | B23K 26/082 |
| | | | 219/121.81 |
| 6,180,913 B1 | 1/2001 | Kolmeder et al. | |
| 6,206,321 B1 | 3/2001 | Pumpe | |
| 6,234,943 B1 | 5/2001 | Copin | |
| 6,241,646 B1 * | 6/2001 | Tokarski | B65D 5/065 |
| | | | 493/59 |
| 6,368,263 B1 | 4/2002 | Lynch et al. | |
| 6,427,420 B1 * | 8/2002 | Olivieri | B65B 61/02 |
| | | | 493/212 |
| 6,521,866 B1 | 2/2003 | Arai et al. | |
| 6,540,952 B2 * | 4/2003 | LaPoint | B23K 26/361 |
| | | | 219/121.85 |
| 7,361,131 B1 | 4/2008 | Abrott | |
| 7,654,391 B2 * | 2/2010 | Langer | B65D 81/113 |
| | | | 206/521.1 |
| 8,342,068 B2 | 1/2013 | Adami | |
| 8,785,811 B2 * | 7/2014 | Bucklew | B23K 26/38 |
| | | | 219/121.72 |
| 9,045,292 B1 | 6/2015 | Ben-David et al. | |
| 9,434,504 B2 | 9/2016 | Fisher et al. | |
| 9,492,984 B2 * | 11/2016 | Ben-David | B31B 50/022 |
| 2002/0170886 A1 | 11/2002 | Lawson | |
| 2003/0218278 A1 * | 11/2003 | Tait | B23K 26/38 |
| | | | 264/2.7 |
| 2006/0014616 A1 * | 1/2006 | Baggot | B23K 26/0846 |
| | | | 493/63 |
| 2006/0219072 A1 | 10/2006 | Tynkkynen et al. | |
| 2008/0078751 A1 * | 4/2008 | Abrott | B23K 26/03 |
| | | | 219/121.69 |
| 2008/0081753 A1 | 4/2008 | Abrott | |
| 2008/0179304 A1 | 7/2008 | Osako et al. | |
| 2010/0139464 A1 * | 6/2010 | Holm | G05B 19/182 |
| | | | 83/76.1 |
| 2011/0092351 A1 * | 4/2011 | Hatano | B31B 50/00 |
| | | | 493/162 |
| 2012/0121802 A1 * | 5/2012 | Zimmer | C08L 23/02 |
| | | | 118/697 |
| 2013/0292226 A1 | 11/2013 | Ben-David et al. | |
| 2015/0148940 A1 * | 5/2015 | Ben-David | B31B 50/022 |
| | | | 198/689.1 |

FOREIGN PATENT DOCUMENTS

| | | |
|---|---|---|
| DE | 40 23 997 B4 | 3/2004 |
| JP | 2001-001419 A | 1/2001 |
| JP | 2008-105212 A | 5/2008 |
| JP | 2010-506806 A | 3/2010 |
| WO | 2008/046896 A1 | 4/2008 |

OTHER PUBLICATIONS

International Search Report of PCT/IL2013/000071, dated Dec. 31, 2013. [PCT/ISA/210].

* cited by examiner

METHOD AND SYSTEM FOR CARDBOARD PRETREATMENT

CROSS-REFERENCE TO RELATED APPLICATIONS

This application is a divisional of U.S. patent application Ser. No. 14/427,022, filed Mar. 10, 2015, which is a National Stage of International Application No. PCT/IL2013/000071, filed Sep. 16, 2013, claiming priority based on U.S. Provisional Patent Application No. 61/703,239, filed Sep. 19, 2012, the contents of all of which are incorporated herein by reference in their entirety.

TECHNICAL FIELD

The present disclosure generally relates to cardboard processing, and more particularly to a system and method of cardboard processing.

BACKGROUND

The rapid evolution of trade around the world as part of the globalization creates significant demand for packaging required to transfer and distribute goods to remote areas. The transport of goods may be done in any transportation device such as ship, airplanes, trucks, or others, and may be performed by the manufacturer, suppliers, distributors, individuals or others. Further, significant demand exists for paper products such as brochures, flyers, or the like. The different paper products may have pre-folds, cuts, or embossing, including but not limited to decorations and Braille writing.

Packaging has a major role in marketing today. The package in which goods are packed and presented, in a store for example, may determine how much the goods will appeal to potential buyers in the store. Thus the packaging appearance can have a direct effect on the sales of merchandise. The brochures, flyers, and so on, especially if well designed, for example with cut-out areas, may also contribute to the awareness and sales of a product or a service.

Containerboard, also referred to as CCM or corrugated case material, is a type of paperboard manufactured for the production of corrugated board. The term containerboard encompasses both linerboard and corrugating medium (or fluting), the two types of paper that make up corrugated board. Containerboard is made mainly of natural unbleached wood fibers. For certain boxes, white bleached pulp or coating may be used on the top ply of the linerboard that goes outside the box.

Corrugated plastic or corriboard, also known under the trade names of Coroplast®, IntePro®, Correx, Twinplast, Corriflute or Corflute® refer to a wide range of extruded twinwall plastic-sheet products produced from high-impact polypropylene resin with a similar make-up to corrugated fiberboard.

Corrugated fiberboard is a paper-based material consisting of a fluted corrugated sheet, also referred to as corrugated medium, and one or two flat linerboards, attached to the fluted corrugated fiberboard on one or both sides. Corrugated fiberboard is widely used in the manufacture of corrugated boxes and shipping containers. The corrugated medium and linerboard may be made of containerboard which is a paper-like material.

The corrugated medium may be heated, moistened, and formed into a fluted pattern on geared wheels. It may then be attached to a flat linerboard with a starch-based adhesive, to form single face board. For manufacturing a double-backer, a second flat linerboard is attached on the other side of the fluted medium. The liner may be bleached white, mottled white, colored, or preprinted.

Common flute sizes are "A", "B", "C", "E" and "F" or microflute, wherein the letter designates the order in which the flutes were introduced. The flute size indicates the number of flutes per foot, although the actual flute dimensions for different corrugator manufacturers may slightly vary. Measuring the number of flutes per linear foot is a more consistent manner for identifying flute size than measuring board thickness, which can vary due to manufacturing conditions.

TABLE 1 below provides the dimensions of Standard US Corrugated Flutes

| Flute Designation | Flutes per linear foot | Flute thickness (in) | Flutes per linear meter | Flute thickness (mm) |
|---|---|---|---|---|
| A flute | 33 +/− 3 | 3/16 | 108 +/− 10 | 4.8 |
| B flute | 47 +/− 3 | 1/8 | 154 +/− 10 | 3.2 |
| C flute | 39 +/− 3 | 5/32 | 128 +/− 10 | 4.0 |
| E flute | 90 +/− 4 | 1/16 | 295 +/− 13 | 1.6 |
| F flute | 128 +/− 4 | 1/32 | 420 +/− 13 | 0.8 |

Corrugated fiberboard parameters may include construction parameters (such as single face, singlewall, doublewall, or the like), flute size, various strength measures, surface treatments and coatings, and others.

The choice of corrugated medium, flute size, combining adhesive, linerboards and other parameters can vary in accordance with the usage requirements. For example, double- and triple-wall corrugated board may be used when high stacking strength and puncture resistance are required.

Henceforth, throughout the description, drawings and claims of the present disclosure, the terms package, paperboard box, parcel, box, carton box, cardboard box, brochure, flyers, corrugated board, etc. may be used interchangeably. The present disclosure may use the term package as a representative term for the above group.

Packaging engineers design corrugated boxes to meet the particular needs of the product being shipped, the hazards of the shipping environment (e.g., shock, vibration, compression, moisture, etc.), and the needs of retailers and consumers.

A known preliminary requirement, in order to construct a package, is preparing or purchasing a pre-treated cardboard or paper-based material. Paper-based material may be of different types, such as waxed paper, cartridge paper, art paper, paperboard, containerboard, or others. Henceforth, throughout the description, drawings and claims of the present disclosure, the terms cardboard, card-stock, display board, corrugated fiberboard, paperboards of different paper based material, folding boxboard, carton, blanks, blister cards, plastics, boards/papers with lamination, and so on, may be used interchangeably. The present disclosure may use the term cardboard as a representative term for the above group.

The pre-treatment of a cardboard may include the following acts: creating folding lines along the cardboard to ease and provide accurate folding of the cardboard; piercing the cardboard in different areas; creating embossment in different areas of the cardboard; cutting the raw cardboard into predefined shapes; scoring the cardboard, partially cutting the raw cardboard, perforating the raw cardboard and so on.

Henceforth, in the description, drawings and claims of the present disclosure, the terms pre-folded cardboard, and pre-treated cardboard may be used interchangeably. The present disclosure may use the term pre-treated cardboard as a representative term for the above group.

Some common techniques for preparing a pre-treated cardboard include the acts of placing the cardboard between dies. Known dies include a steel-rule die and a counter-die. The steel-rule die may include a variety of different types of dies such as a cutting-die, a creasing-die, an embossing-die, a scoring-die, a combination of the different types of dies, or the like. In some embodiments, the steel-rule die body may be made of hard-wood-based material such as plywood, maple wood, etc. Other exemplary materials may include plastic, metal, fabric, etc. The body material is required to have high-dimension stability and high-grade. It should also be without voids or other imperfections.

In some embodiments, one or more steel rules may be inserted deeply and firmly into a plurality of pre-made slots in the steel-rule die's body. The pre-made slots may support the steel-rule during the operation of the cutting, creasing or embossing of numerous cardboards. The steel rules usually consist of cut and bent blades made of hardened steel or another hard material. Usually one or more ejection (rebound) rubber members need to be placed and glued around the steel-rules. Without the ejection rubber, the cardboard may tend to get stuck amongst the steel rules.

The counter-die comprises a body, which may be made of hard-wood-based material, plastic, metal, fabric, or others. Commonly, a plurality of trenches may be grooved in the counter-die, for the rules to be inserted into. The trenches' location and structure are required to fit precisely the location and structure of the steel-rules of the steel-rule die.

BRIEF DESCRIPTION OF THE DRAWINGS

Exemplary embodiments of the present disclosure will be understood and appreciated more fully from the following detailed description, taken in conjunction with the drawings in which.

BRIEF SUMMARY

Figure 1A:
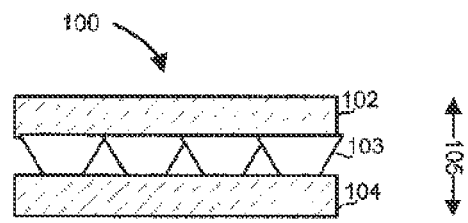
FIG. 1A is a simplified block diagrams illustrating an exemplary portion of a corrugated cardboard.

One exemplary embodiment of the disclosed subject matter is a cardboard pretreatment system comprising: a processing module for processing a cardboard along a line; and a creasing module for creating a crease on the cardboard, along the line, prior to processing. Optionally, the processing module is a laser module. Within the cardboard pretreatment system, the processing module comprises one or more modules selected from the group consisting of: a cutting module, a scoring module, a perforating module, a partially cutting module, and a marking module. The cardboard pretreatment system may further comprise a controller for controlling passage of an input cardboard through the creasing module where the pre-process crease is applied to the cardboard, and through the processing module where a cut is applied along the at least one pre-process crease. Within the cardboard pretreatment system, the creasing module may also be configured to create at least one crease on the cardboard, along which no further processing is required. Within the cardboard pretreatment system, the cardboard may be corrugated cardboard and the creasing module may reduce a thickness of the cardboard along the pre-processing crease. Within the cardboard pretreatment system, the processing module is optionally a laser module having a depth of focus and the thickness of the cardboard is optionally reduced to a value smaller than the depth of focus.

Another aspect of the disclosure relates to a method for using a cardboard processing system, comprising: receiving a treatment description comprising a description of a cut to be applied to a cardboard; reading location and shape for the cut; and creating a crease rule in accordance with the location and shape of the cut. The method may further comprise reading a location and shape for a crease; and creating a set of crease rules in accordance with the location and shape of the crease. Within the method, the crease rule may be created on a crease-die. The method may further comprise operating a cardboard processing system containing the crease rule. Within the method, the cardboard is optionally corrugated cardboard and the crease rule optionally reduces thickness of the cardboard along the crease. Within the method the cardboard processing system optionally comprises a laser module having a depth of focus, and wherein the thickness of the cardboard is reduced to a value smaller than the depth of focus.

Yet another aspect of the disclosure relates to a method for cardboard processing, comprising: creating a pre-processing crease at a location on the cardboard where it is required to process the cardboard; and processing the cardboard along the pre-process crease. Within the method, the cardboard is optionally corrugated cardboard and the creasing reduces a thickness of the cardboard along the pre-processing crease. Within the method, the thickness is optionally reduced to a value smaller than the depth of focus of a laser system using for cutting the cardboard.

DETAILED DESCRIPTION OF EXEMPLARY EMBODIMENTS

Turning now to the figures in which like numerals and/or labels represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures are for illustration purposes only and are not necessarily drawn to-scale and were chosen only for convenience and clarity of presentation.

The disclosure relates to a pre-treatment system for cardboards, wherein pre-treatment may include any type of processing such as creating creases, partial cuts, full cuts, embossments, or the like. Processing may be made by cutting equipment such as rule die and counter die, a laser equipment, for example a laser source generating a laser beam, or the like. An important factor in pretreatment, and especially when the handled material is corrugated cardboard, is the thickness of the cardboard.

A laser system as used in some embodiments of the disclosure is used to cut, partially cut, perforate, mark, or otherwise treat the material using laser energy. The laser treats materials by delivering energy into the material, at a level sufficient to treat the material. The energy quantity depends on various factors, including the laser source intensity and the time the laser illuminates the material. For example, the time may be determined by the cutting speed, i.e., the speed with which the laser spot illuminating the material surface traverses it. It is common to control the energy quantity to be delivered to the treated material by setting the laser intensity and the traverse speed (speed in which the laser spot traverses across the treated material), which together set the treatment speed. Optionally, other factors may be taken into account as well. If the laser beam is not focused properly on the material surface, the illuminated area on the material will become larger, thus reducing the laser intensity, which is determined as the energy divided by the illuminated area, and may require slower treatment speed. However, if the process speed, for example the cutting speed is too slow for the required energy delivery quantity, the material may become overheated, resulting in damage to the material in the vicinity of the treatment path, for example the cutting line. This damage can take many forms, such as brown or black burning marks in the vicinity of the cut line, and is known in the industry in many names, for example Heat Affected Zone (HAZ). The damage may be minimized when the treatment speed is proper, e.g., achieving exactly the required effect and not staying longer, thus avoiding overheating the material in the vicinity of the treatment path.

Typical laser beams, focused to provide energy density sufficient for pretreating cardboard (for example full cut or partial cut), have a limited depth of focus. The depth of focus is approximately twice the distance between the focus point, (i.e., the point on the beam axis at which the diameter of the laser beam is smallest), and a point along the beam axis where the beam diameter is large enough such that the energy density is reduced to such level that requires, for example slower treatment speed. The depth of focus is thus defined as the length along the laser beam path that preserves substantially uniform process speed, for example not slower by a factor of more than 1.2. The distance is typically approximately symmetric around the focal point. The depth of focus depends on many factors, including the specific optical setup, for example the F number and the working distance); the laser beam wavelength; the laser energy level and intensity, or the like. For example, the depth of focus in a specific cardboard cutting setup, using a laser beam from a $CO_2$ laser source at 10.6 microns wavelength) and with specific optics, is 1.5 mm long, wherein the best focus is achieved approximately in the middle.

If the material to be treated, for example to be cut, is of high thickness, for example thicker than the depth of focus of the specific setup, there may be an undesired situation where the required process speed varies along the depth of the material. At the best focus point and at the depth-of-focus region around it (e.g. the region above and below the best focus point when the cardboard is in horizontal position, which is still within the depth-of-focus distance), the process speed may be faster than at regions out of the depth of focus. In such cases, in order to achieve full process completion, the process speed may have to be set to a slower value. However, in this case, the volume around the treatment line (for example cut line) which is within the region within the depth of focus may suffer from HAZ, due to too slow process speed.

In order to solve the problem, more intense laser source may be used, which may result in HAZ in the vicinity of the treated lines. In another alternative, the laser beam may be adapted to traverse the treated lines twice or more to ensure full cut. However, this method significantly reduces the throughput of the treatment system and increases the costs, as each cardboard has to undergo a longer process. In yet another alternative, the speed required to pre-treat the cardboard may be reduced. In all of these alternatives, the thicker the cardboard, the higher are the treatment time, the time to market, power requirements of a laser or other sub-systems, costs of the needed machinery, operation costs, or other parameters, while parameters such as cut quality may be decreased. Generally, the thicker the cardboard, the more time, power or other resources may be required to pre-treat it.

The solution described in the disclosure relates to adapting the system to create creases not only where creases are required in the ready product, but also where cuts are required. Creating a crease flattens or thins the cardboard at the location, which is particularly significant in corrugated cardboard. Having thinned the corrugated cardboard, when the cardboard is later treated, for example cut, for example by a laser beam, the laser beam may be focused along the full thickness of the cardboard, as the thickness of the cardboard is reduced to be contained within the depth of focus. This may result in a full and exact cut, with no HAZ in the vicinity of the treated line, and no need for slower treatment speed or for additional passes.

In some machines, the shapes and locations of the required creases and cuts are indicated in a computerized file, for example in DXF format.

In some machines, the creases are created by the rule die having thereon polymer lines or areas in the required crease shapes and locations. The rules may be formed (once for every batch of cardboards) by a nozzle injecting the polymer over a plan, a cylinder, a drum, or the like, followed by curing the material, if required. This process may be performed as described, for example, in International Patent Publication no. WO2011/145092. The cuts may be created by a laser beam emitted in accordance with the shapes and locations of the required cuts. The process may thus be adapted to also create creases at the shapes and locations of the required cuts, such that when the cardboard gets to the cutting module it is already creased and therefore thinned at the treatment locations, such that the treatment becomes more effective as described above. The pre-treated crease may crease the cardboard through its full thickness and/or through only a part of its thickness. Exemplary range may be 20%-60% of the cardboard's thickness.

It will be appreciated that creating creases where cuts are required may be used not only with laser cuts but also with one other cutting method, such as cutting by a rule die and counter die. It will also be appreciated that adding creases at the cut locations may also be applied to other boards, such as corrugated plastic or corriboard.

Figure 1B:
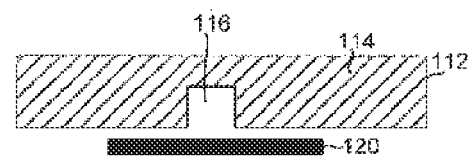
FIG. 1B is a simplified block diagrams illustrating an exemplary portion of a rule-die and counter-die system.
Figure 1B:
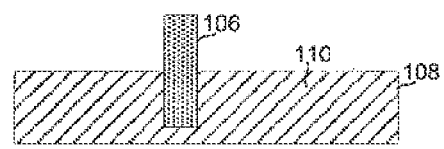
Figure 2:
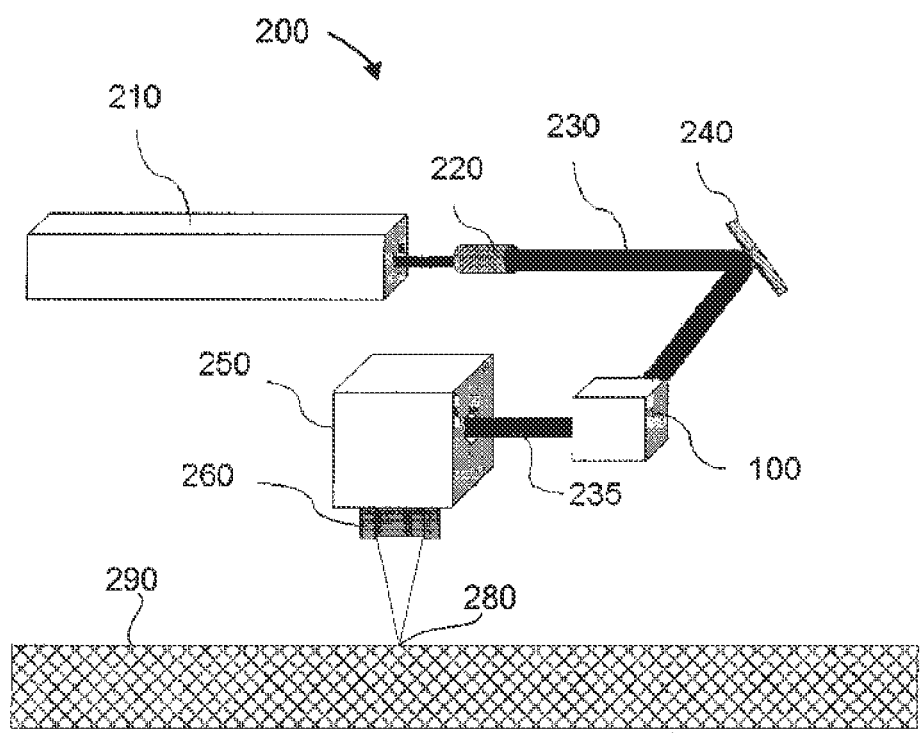
FIG. 2 illustrates a simplified block diagrams with relevant elements of an exemplary optical system.
Figure 3:
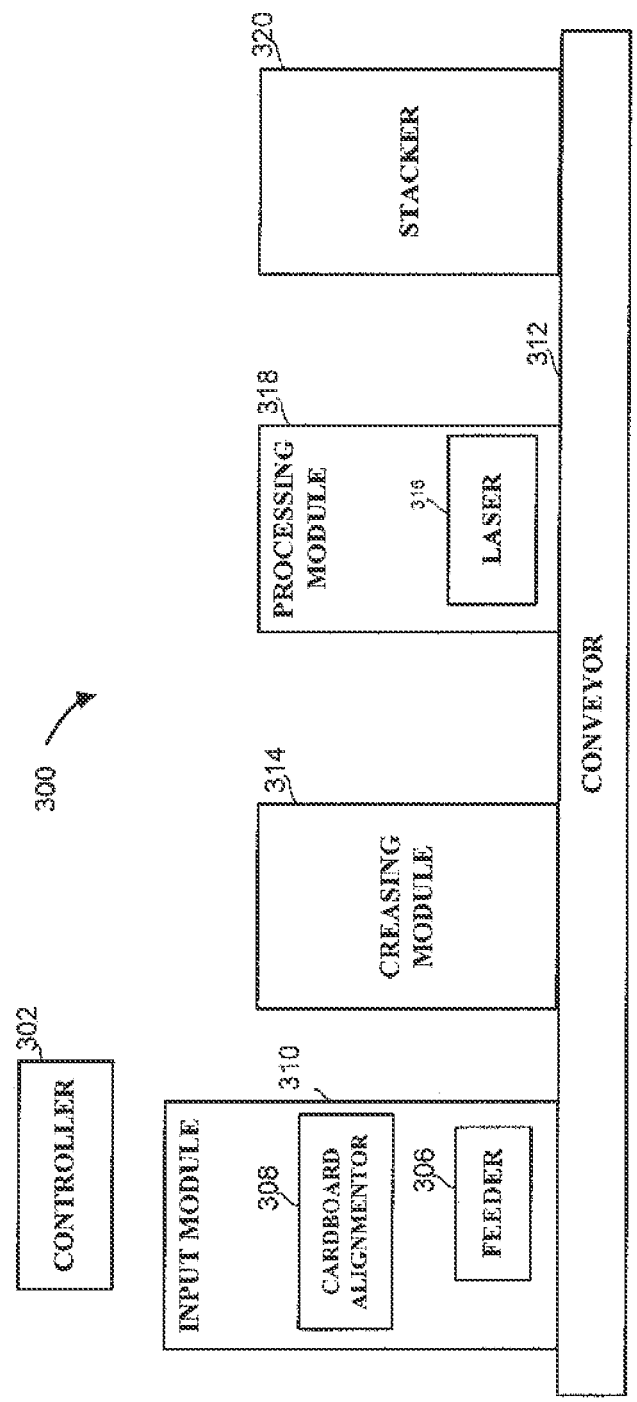
FIG. 3 depicts a schematic diagram of a portion with relevant elements of an exemplary cardboard pretreatment system, in accordance with some exemplary embodiments of the present disclosure.

FIGS. 1-3 below describe aspects of the adapted machine and process.

FIG. 1A depicts a schematic diagram with relevant elements of a portion of an exemplary cardboard 100. Cardboard 100 may comprise fluted corrugated sheet 103 and one or two flat linerboards 102 and 104. Thickness 105 of the corrugated cardboard may be defined as the total thickness of the cardboard elements as attached, including fluted corrugated sheet 103 and linerboards 102 and/or 104.

FIG. 1B depicts a schematic diagram with relevant elements of a portion of an exemplary rule-die 108 and an exemplary counter die 112. Rule-die 108 may comprise a body 110 and one or more rules 106 protruding from body 110. Any of rules 106 may be a cutting rule, a creasing rule, an embossing rule, etc. Counter die 112 may comprise a body 114, and one or more trenches 116. A cardboard 120 may be placed between rule-die 108 and counter-die 112 to be pre-treated by the dies. Cardboard 120 may be similar to cardboard 100.

In some embodiments, as detailed in association with FIG. 3 below, different actions and in particular creasing/embossing or cutting are performed at different stages during the process and by different parts. For example, creasing may be performed as described above by rule-die 108 and counter-die 112, while cutting may be performed at another stage by a laser system.

In some embodiments, rule 106 may be created and may create creases not only where creases are required but also where cuts are required, thus flattening or thinning cardboard 120 so that treatment, for example cutting, which is performed later in the process is more efficient.

Exemplary rule-dies and counter-dies may be flat dies; other exemplary rule-dies and counter dies may be dies implemented on or as drums or cylinders. Some exemplary embodiments of the present disclosure may comprise rule-dies and/or counter-dies created fully or partially by surface-adhesive-rule technology (SART) dies. The rule-dies or counter-dies may comprise steel dies, wooden dies, dies made of any other material, a combination thereof, or the like. Yet other exemplary embodiments of the present disclosure may comprise rule-dies or counter-dies created fully or partially by Selective Laser Sintering, Fused Deposition Modeling, Three Dimensional Printing, Multi-Jet Modeling, Stereo Lithography, a combination thereof or the like.

In some embodiments, rules 106 of rule die 108 may be created by a nozzle injecting polymer in accordance with a given design, over rule die 108 formed as a plane or a cylinder, made for example of PET, plastic, or any other adequate film. or the like. In such cases, counter-die 112 may not comprise trenches 116 but rather a softer cover into which cardboard 120 is jammed when pressed by rules 106.

More information on the surface-adhesive-rule technology (SART) and the surface-adhesive rules (SAR) flexible material, may be found in United States application titled "Flexible material for surface adhesive rule" having Ser. No. 13/108,312; U.S. application titled "Method and system for surface adhesive rule technology" having Ser. No. 13/108, 389; United States application titled "Method and system for creating co-layer surface adhesive rule" having Ser. No. 13/108,450; United States application titled "Method and system for creating surface adhesive rule counter die" having Ser. No. 13/108,526; and "Method and system for surface adhesive rule technology" assigned the Serial No: PCT/IL 2011/000389. The above applications are incorporated herein by reference in their entirety.

Referring now to FIG. 2, illustrating a simplified block diagram with relevant elements of an exemplary optical system 200 which may be a part of a cutting system or of a pre-treating machine as described in association with FIG. 3 below. An exemplary cutting system may have one or more optical systems 200. Each system 200 may be placed on a axis perpendicular to the movement axis of cardboard 290 to be cut along the pre-treating machine. An exemplary optical system 200 can comprise, among other elements: a laser source 210 for generating a laser beam 230; at least one beam expander 220 through which the laser beam passes; a scanner 250, such as but not limited to a galvo-scanner; and an F-Theta or telecentric lens or objective 260.

In addition, one or more mirror 240 may be used, depending on the location to be cut on cardboard 290. In other exemplary embodiments a mirror may not be necessary. The mirror may be folding, rotating or the like.

Laser source 210 may be a $CO_2$ laser type, a Yttrium Aluminum Garnet (YAG) laser type, a fiber laser type or the like. The beam power may be in the range of few watts to several thousands of watts. Laser source 210, which may deliver, for example, 100 to 500 watts, may be used for cutting cardboard sheets having thickness from about 0.2 mm to about several mm, for example. The power of the laser and the number of the required optical systems 200 may be a function of the required cutting speed, the size of the cardboard and its thickness, the length of the cuts to be performed, the required system throughput, and possibly other factors.

During operation, laser source 210 may generate laser beam 230 that may pass through beam expander 220 in order to get a desirable diameter to meet the system requirements. The beam may then pass via one or more mirrors 240 in order to comply with the required optical path along optical axis 235. The power of the laser beam may have a designed value that is adapted to cut the material faster.

In some exemplary embodiments, laser beam 230 advancing along optical axis 235 may enter scanner 250. Scanner 250 may control the cutting path of the beam 230 along a predefined pattern over cardboard 290 to be cut. Scanner 250 may be a galvo-scanner that may include a mirror for reflecting the beams along an axis, for example. The reflected beam may pass through a lens such as but not limited to an F-Theta or telecentric lens. In other exemplary embodiments, galvo scanner 250 may have three axes. In such a scanner, in addition to the two mirrors, the laser beam advancing along optical axis 235 may pass via a dynamic focusing lens and then via a static focusing lens, mounted inside the scanner before the scanner mirrors. The laser beam will be focused close to the upper surface of cardboard 290 at focal point 280, for example. Another possible laser scanning method may be based on an x-y table, where the laser source, the table, or both are moved along trajectories that fit the treatment required geometry.

Once cardboard 290 is having its thickness reduced at the intended location of the cut by the creasing nodule, having the laser beam focused on the location such that the thickness of the cardboard is within the depth of focus, may be sufficient for cutting the reduced thickness of the cardboard, and no intensifying of the laser beam, slower speed, or additional passes are required.

Referring now to FIG. 3 showing a schematic simplified block diagram with relevant elements of an exemplary cardboard pretreatment system 300, which may create a plurality of cuts and creases on a substrate such as cardboard.

Exemplary embodiments of cardboard pretreatment system 300 may comprise: a cardboard input module 310; one or more conveyors 312; one or more creasing modules 314 such as die rules and counter dies or other mechanisms for creating creases on the cardboard; one or more cutting modules 318; and one or more stackers 320 for placing the creased and cut boards in a stack. Cardboard pretreatment system 300 may further comprise a stripping unit to separate the product (for example folding carton boxes) from the rest of the cardboard sheet, which is waste. Cardboard pretreatment system 300 may further comprise one or more synchronizing mechanisms and/or a controller 302. It will be appreciated that other exemplary embodiments of cardboard pretreatment system 300 may not comprise all of the above mentioned modules and/or may comprise more of the same modules and/or more different modules. In yet other exemplary embodiments of a cardboard pretreatment system 300 the above modules may be arranged in a different order, and so on.

Exemplary embodiment of cardboard input module 310 may comprise a cardboard feeder 306, a cardboard aligner 308, and one or more cardboard transferors (not shown). Feeder 306 is responsible for receiving a cardboard from an input channel and placing it on conveyor 312 so it can undergo the pre-treatment. Feeder 306 may grab a cardboard and transfer it toward cardboard aligner 308. Cardboard aligner 308 may align the cardboard to the required direction and position (along the running direction of the conveyor, for example). In some exemplary embodiments, cardboard aligner 308 may also convey the cardboard toward the next module of cardboard pretreatment system 300. In some exemplary embodiments, aligner 308 may speed or slow conveyor 312 or one or more rule dies, or change the speed or behavior of other parts of the machine to ensure that the cardboard meets the die rules and counter dies in a location such that the die rules will create the creases, cuts, embossments, or other pretreatments in the required locations on the cardboard. Conveyor 312 may grab the cardboard and lead it in a fix-relative-position toward and/or through one or more modules of cardboard pretreatment system 300. An exemplary conveyor 312 may comprise a side gripper. In some exemplary embodiments, conveyor 312 may convey the cardboard through all the modules of cardboard pretreatment system 300. In other exemplary embodiments conveyor 312 may convey the cardboard through part of cardboard pretreatment system 300. Conveyor 312 may be synchronized with one or more modules of the cardboard pretreatment system 300, wherein synchronization may be carried out by controller 302.

The cardboard may pass through creasing module 314, for creating creases where creases are required, and also where cuts or other types of pretreatment are required. Dies rules may be creasing rules, however in some embodiments, die rules 312 may also be cutting rules, piercing rules, embossing rules, a combination thereof, or the like.

Conveyor 312 may be synchronized with creasing module 314. The synchronization may verify that the dies are placed in the required position to the cardboard, for example as detailed in association with aligner 308 above. If the cardboard is not synchronized, the cardboard may be shifted, accelerated or slowed; the location of dies may be aligned using digital means, or the dies may be moved or rotated until they are placed correctly, and only then conveyor 312 may convey the cardboard toward and/or through creasing module 314 to be pre-treated.

Conveyor 312 may convey the cardboard toward and/or through one or more processing modules 318, wherein processing may relate to cutting, scoring, perforating, partially cutting, marking, or other operations and more. Processing module 318 may comprise a laser subsystem 316 for processing the cardboard as described in association with FIG. 2 above, for example laser 316 may cut the cardboard at pre-defined patterns. Since creases may be created also at the required cut locations, the cardboard will have reduced thickness at these locations, which is particularly significant for corrugated cardboard and provides for more effective processing and in particular cutting since the width of the cardboard does not extend significantly out the focus of the beam.

Conveyor 312 may further convey the cardboard toward and/or through one or more stackers 320, although the cardboard may arrive to stacker 320 in any other manner. An exemplary stacker 320 may transfer the pre-treated cardboard, while supporting the cardboard in a substantially flat situation, for example, over to a stack of pre-treated cardboards. The stacker may release the pre-treated cardboard at a pre-treated cardboard's required final position. An exemplary embodiment of a stacker 320 may comprise a dynamic-size holder that may grip the pre-treated cardboard, from the pre-treated cardboard top surface.

In some embodiments synchronization between modules of cardboard pretreatment system 300 may be mechanical, electrical or a combination thereof. In an exemplary embodiment controller 302 may obtain information from different detectors and/or sensors and/or user inputs. Accordingly controller 302 may send commands to one or more modules for synchronization.

Referring now to FIGS. 4A-4F, showing simplified side views of relevant elements of exemplary surface-adhesive-rule dies (SARD). Each SARD may have a body and a surface-adhesive rule (SAR) having a base and an edge. For all SARDs, the edge of the SARS may match the functionality of creating creases on a cardboard. The SARDs may be adhered to the body. A top view of a SAR may substantially match the shape and area of a crease or cut required to be made to the cardboard.

Figure 4A:
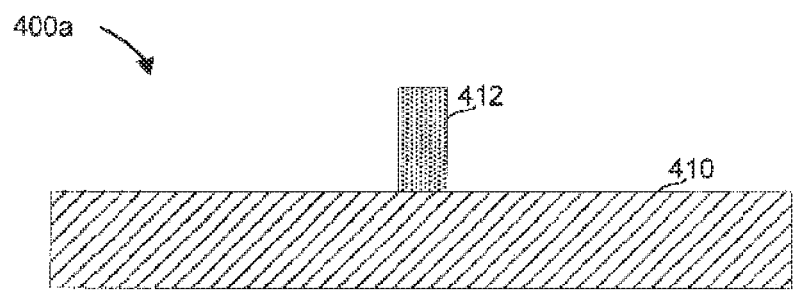
FIGS. 4A-4F are schematic illustrations a plurality of simplified diagrams with relevant elements of exemplary surface-adhesive-rule (SAR) profiles, in accordance with some exemplary embodiments of the present disclosure.

FIG. 4A schematically illustrates a simplified diagram with relevant elements of an exemplary surface-adhesive-rule die (SARD) 400a. SARD 400a may comprise a body 410 and a surface-adhesive rule (SAR) 412.

Figure 4B:
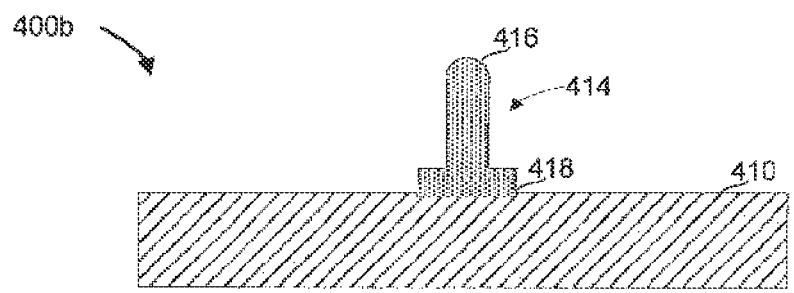

FIG. 4B schematically illustrates a simplified diagram with relevant elements of an exemplary surface-adhesive-rule die (SARD) 400b having a body 410, and in which the shape of a surface-adhesive rule (SAR) 414 may comprise a wide base 418, and a rounded-shape top edge 416.

Wide base 418 may improve the bonding of the SAR 414 to body 410 of SARD 400b. Wide base 418 may further enhance the ability of SAR 414 to withstand the numerous forces that may be applied during its operations.

Figure 4C:
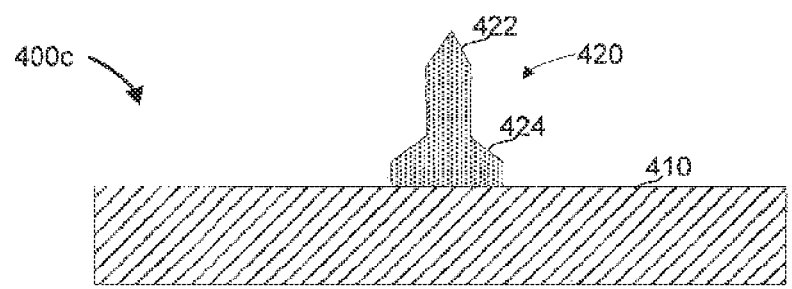

FIG. 4C illustrates another exemplary embodiment of a SARD 400c having a body 410. SARD 400c may comprise a SAR 420 with a sharp top edge 422. SAR 420 may further comprise shoulder-like sides 424. Shoulder-like sides 424 enhance the ability of SAR 420 to withstand numerous forces applied during its operation. In some exemplary embodiments the sharp edge may be achieved by further milling or scraping the edge after hardening the SAR.

Figure 4D:
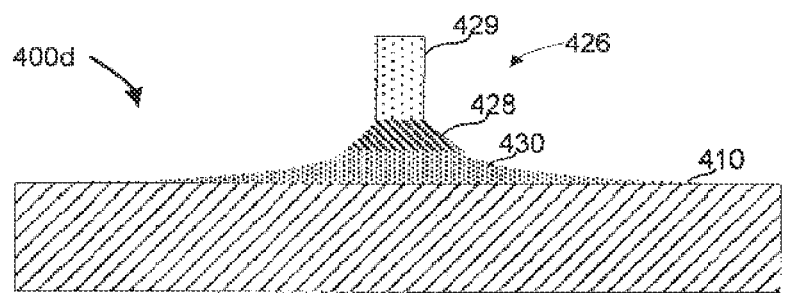

FIG. 4D schematically illustrates yet another simplified diagram with relevant elements of an exemplary SARD 400d having a body 410. SARD 400d may comprise a SAR 426. SAR 426 may be comprised of a multiplicity of members. One member may be base 430, another member may be shoulder-like sides 428, and a third member may be body 429 having a top edge.

Each of the members of SAR 426 may be made of different material or, one or more members may be made of materials different from other members. Each member may have a different shape and may comprise different polymer or additive types, and thus have different required attributes.

For example, base 430 may be required to have better adhesive attributes, body 429 may be required to have elastic attributes, shoulder-like sides 428 may be required to have more firmness attributes, or the like.

Figure 4E:
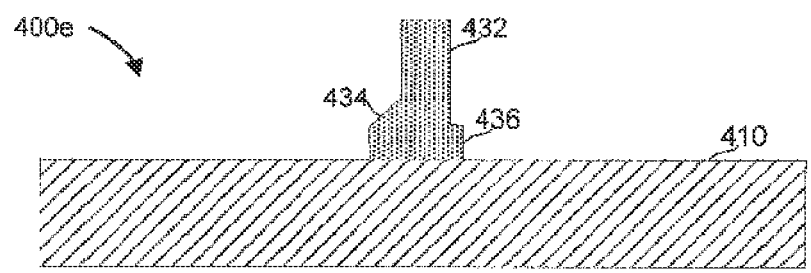

FIG. 4E illustrates yet another exemplary embodiment of a SARD 400e, comprising a body 410 and a SAR 432 having an asymmetrical shape. SAR 432 may be comprised of a one shoulder-like side 434 and an asymmetrical base 436. An asymmetrical SAR may be used when the cardboard design comprises adjacent cuts or creases, thus necessitating adjacent SARs.

Figure 4F:
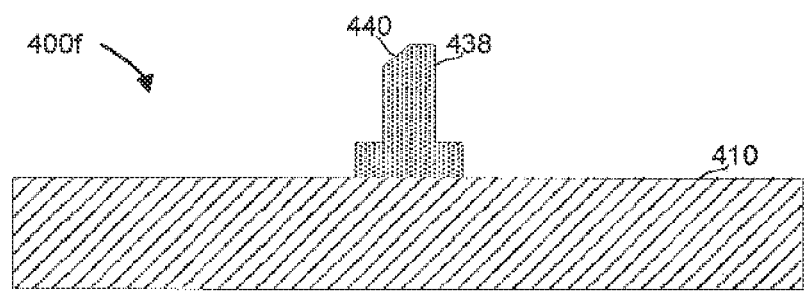

FIG. 4F illustrates an exemplary embodiment of a SARD 400f comprising a body 410 and SAR 438 with a trapezoid-like shape top edge 440. Trapezoid-like shape top edge 440 may be used as a cutting SAR in a rotary system, for example.

It will be appreciated that multiple SAR shapes other than the SARs depicted in FIGS. 4A-4F may be designed and used, using different profiles or different materials. Certain SAR shapes may be more suitable for certain tasks, such that the shape and materials can change between different cardboard tasks. In some embodiments, different SARs may be used on the same rule die for forming different creases and cuts of the same cardboard.

It will be appreciated that in implementations in which the rules are formed by injecting material such as polymer, the shapes disclosed above may not be relevant, and all rules may be formed substantially in the form of flattened pipeline. The pipe cross section, e.g., shape, width or thickness, may be determined by the amount of material injected, the injection speed, the material curing speed, or the like.

Figure 5:
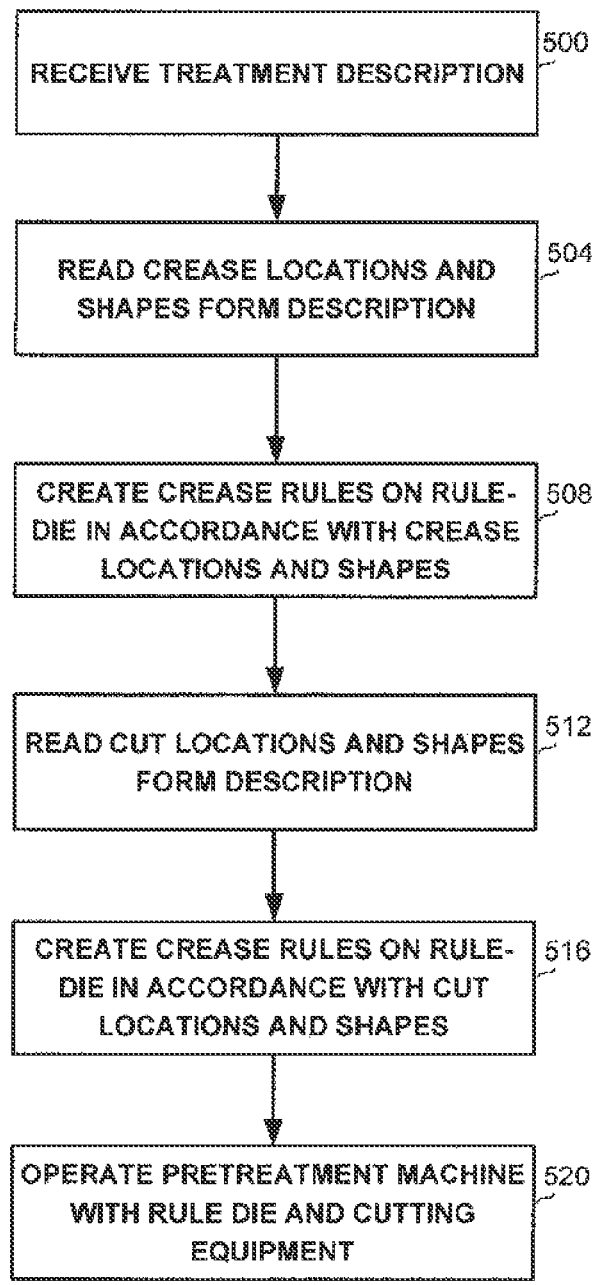
FIG. 5 is a schematic illustration of a flowchart showing relevant acts of an exemplary method of pretreating a cardboard, in accordance with some exemplary embodiments of the present disclosure.

Referring now to FIG. 5, showing an exemplary flowchart of steps in preparing for pretreating a cardboard.

On step 500 a description of treatment to be applied to cardboards may be received. The description may be received as a file, a stream of data, output from a user interface of a design application, or the like. The description may comprise locations or shapes of creases to be created on the cardboard. The description may further comprise crease depth or additional parameters. The description may further comprise locations or shapes of cuts to be cut on the cardboard.

On step 504, crease locations and shapes may be read from the description, and on step 508 rules corresponding to the locations and shapes may be created on a rule die which may be plan, a drum, or the like. If crease depth is provided, the corresponding rule may be created having corresponding height.

On step 512, cut locations and shapes may be read from the description, and on step 516 rules corresponding to the cut locations and shapes may be created on the rule die. Optionally, the height of the rules associated with cut locations may be the maximal possible height, so as to maximize the thickening of the cardboard at the location.

Thus, the rule die will contain rules in accordance with the locations and shapes of the required creases and of the required cuts.

It will be appreciated that steps 512 and 516 may be performed before, after, or interleaved with steps 504 and 508.

The rules may be created by injecting polymer from a nozzle over a base made for example of PET, or in any other manner.

On step 520 the pretreatment machine comprising the rule die may be operated as described, for example, in FIGS. 5A, 5B and 5C of U.S. provisional Application No. 61/703,239 filed Sep. 19, 2012, which is hereby incorporated by reference in its entirety.

Figure 6:
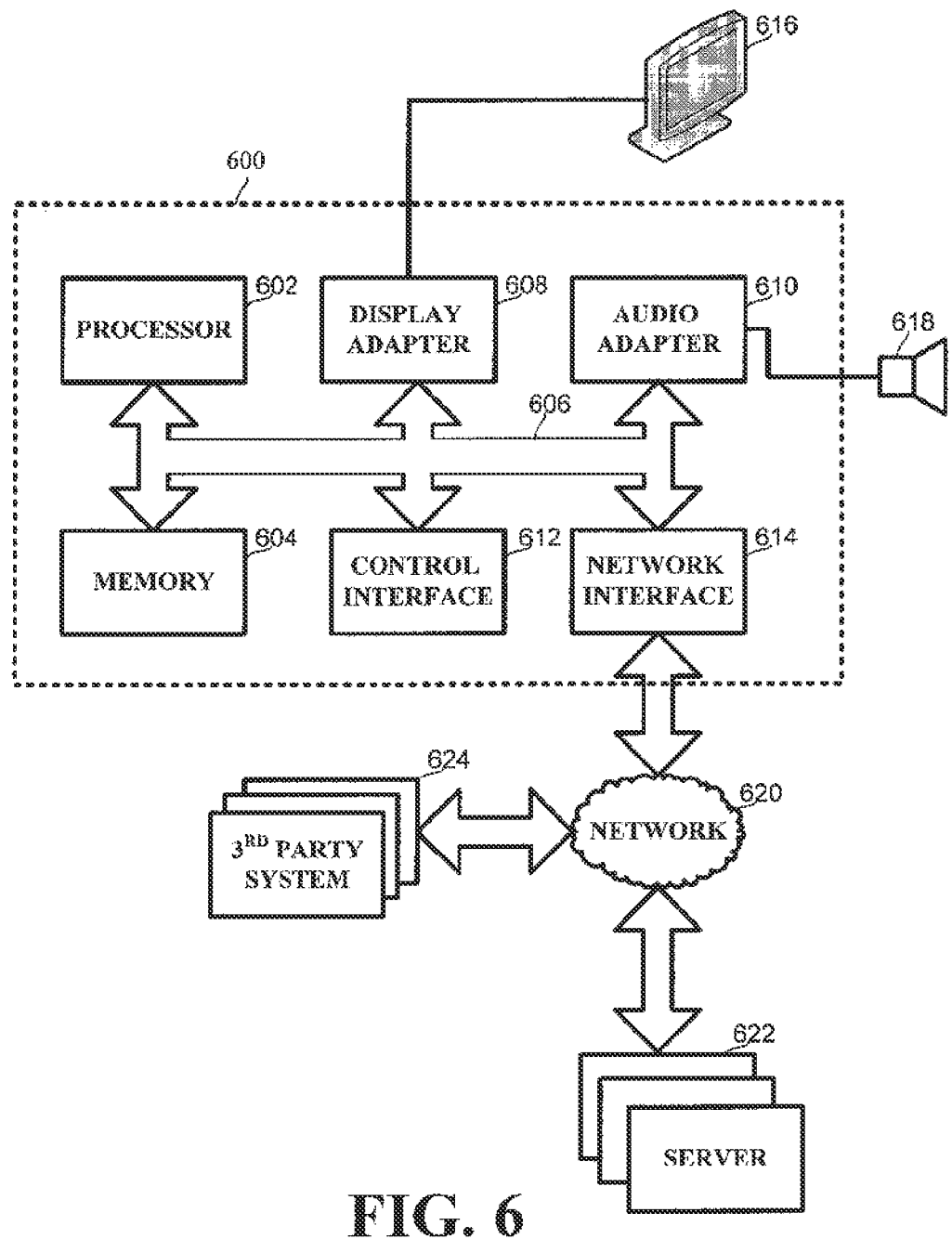
FIG. 6 depicts schematic illustration of relevant elements of a portion of an exemplary embodiment of a controller, in accordance with some exemplary embodiments of the present disclosure.

Referring now to FIG. 6, showing a functional block diagram of the components of an exemplary embodiment of system or sub-system operating as a controller or processor 600 that may be used in various embodiments of the disclosure for controlling aspects of the various embodiments. It will be appreciated that not all of the components illustrated in FIG. 6 are required in all embodiments of the activity monitor but, each of the components are presented and described in conjunction with FIG. 6 to provide a complete and overall understanding of the components. The controller can include a general computing platform illustrated as including a processor 602 and a memory device 604 that may be integrated with each other or, communicatively connected over a bus or similar interface 606. Memory device 604 may comprise executable modules for carrying out steps of the method disclosed on FIG. 5 above. For example, an executable may be responsible for reading an input file describing creases and cuts to be applied to cardboard, sending commands to other components, subsystems or $3^{rd}$ party systems, or the like.

Processor 602 can be chosen from a variety of processor types including microprocessors, micro-controllers, programmable arrays, custom IC's etc. and may also include single or multiple processors with or without accelerators or the like. The memory element of 604 may include a variety of structures, including but not limited to RAM, ROM, magnetic media, optical media, bubble memory, FLASH memory, EPROM, EEPROM, etc. Processor 602 or other components in the controller may also provide components such as a real-time clock, analog to digital convertors, digital to analog convertors, etc.

Processor 602 may also interfaces to a variety of elements including a control interface 912, a display adapter 608, an audio adapter 610, and network/device interface 614. Control interface 612 may provide an interface to external controls such as but not limited to: sensors; actuators; drums; step motors; a keyboard, a computer mouse; an audio activated device, as well as a variety of the many other available input and output devices or, another computer or processing device or the like. Control interface 612 may comprise receiving input from sensors as well as issuing commands to components. For example, control interface 612 may be adapted to send a command to a nozzle to inject polymer in accordance with required crease shapes and locations or cut shapes and locations.

Display adapter 608 can be used to drive a variety of alert elements 616, such as display devices including an LED display, LCD display, one or more LEDs or other display devices.

Audio adapter 610 interfaces to and drives another alert element 618, such as a speaker or speaker system, buzzer, bell, etc. Network/interface 614 may interface to a network 620 which may be any type of network including, but not limited to the Internet, a global network, a wide area network, a local area network, a wired network, a wireless network or any other network type including hybrids. Through network 620, or even directly, controller 600 can interface to other devices or computing platforms such as one or more servers 622 and/or third party systems 624. A battery or power source provides power for controller 600.

The disclosed method and pretreatment machine utilize a creasing mechanism for creating creases on cardboards also where cuts are required, in order to reduce the thickness of treated cardboard so that cuts can be made more efficiently.

Thus, the description covers also a pre-cut creaser, comprising a creasing mechanism and a controller adapted to create one or more pre-cut creases along a cardboard, in locations or shapes where cuts are required on the cardboard. The pre-cut creaser may also comprise a cutter for cutting the cardboard at the locations of the pre-cut creases.

It will be appreciated that the rule preparation is not limited to rules prepared by nozzles releasing polymer, but that any automatic, manual or combined method for creating rules associated with creases may also be applied to creating rules associated with cuts. The method and machine are also not limited to laser cutting. Rather, any cutting method may benefit from reducing the cardboard thickness prior to cutting.

Some experimental results show that for applying cuts to a corrugated cardboard having thickness of 3 mm, the laser beam may be able to traverse the cutting lines at more than twice the speed if creases are created at the shape and locations of the required cuts, relatively to the traversing speed when no creases are created. In some setup, pre-cut creasing increased the speed through the system from 400 mm/s to about 850 mm/s.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

What is claimed is:

1. A method for cardboard processing, comprising:
   creating at least one pre-processing crease at a location on the cardboard where it is required to process the cardboard;
   processing the cardboard along the pre-processing crease by cutting the cardboard along the crease in a direction of the crease;
   receiving a treatment description comprising a description of at least one cut to be applied to a cardboard;
   reading location and shape for the at least one cut; and
   creating at least one crease rule in accordance with the location and shape of the at least one cut.

2. The method of claim 1 wherein the cardboard is corrugated cardboard and wherein the creasing reduces a thickness of the cardboard along the at least one pre-processing crease.

3. The method of claim 2 wherein the processing of the cardboard is the cutting of the cardboard using a laser system, and the thickness is reduced to a value smaller than a depth of focus of a laser system used for cutting the cardboard.

4. The method of claim 2, further comprising:
   reading a location and shape for at least one crease; and
   creating at least one second crease rule in accordance with the location and shape of the at least one crease.

5. The method of claim 1, wherein the at least one crease rule is created on a crease-die.

6. The method of claim 1, further comprising operating a cardboard processing system containing the at least one crease rule.

7. The method of claim 6, wherein the cardboard is corrugated cardboard and wherein the at least one crease rule reduces thickness of the cardboard along the at least one crease.

8. The method of claim 7, wherein the cardboard processing system comprises a laser module having a depth of focus, and wherein the thickness of the cardboard is reduced to a value smaller than the depth of focus.

9. The method of claim 1, wherein the at least one-preprocessing crease is created based on the at least one crease rule.

* * * * *